E. I. JEFFRIES.
STEERING GEAR ANTIRATTLER.
APPLICATION FILED SEPT. 15, 1914.
1,191,792. Patented July 18, 1916.
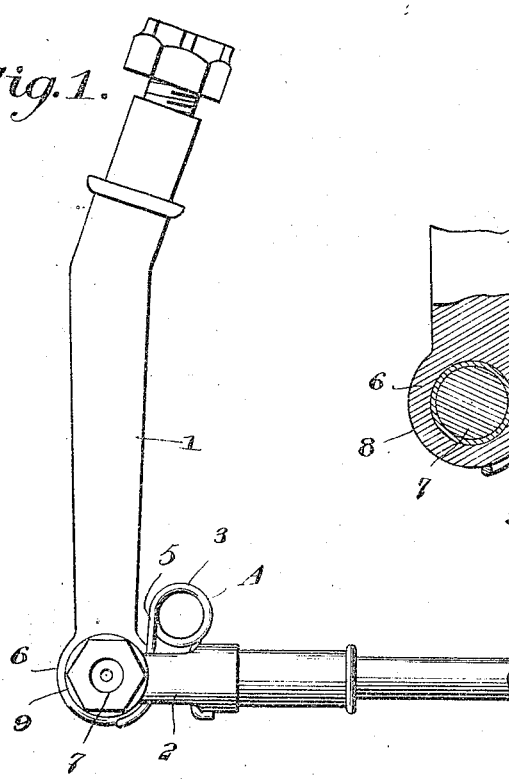
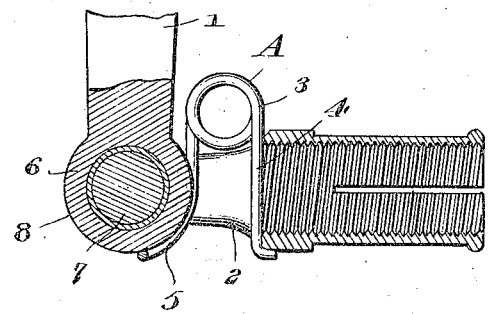
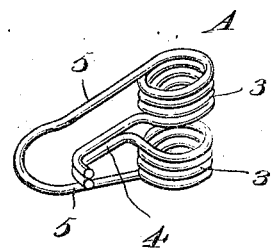
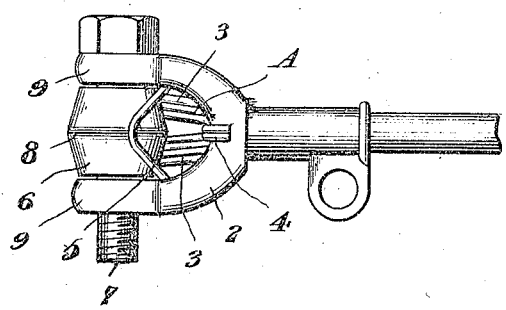
Witnesses
Frederick W. Ely.
P. M. [illegible]
Inventor
E. I. Jeffries,
By Victor J. Evans
Attorney

UNITED STATES PATENT OFFICE.

EWING I. JEFFRIES, OF NEW SALEM, PENNSYLVANIA.

STEERING-GEAR ANTIRATTLER.

1,191,792.  Specification of Letters Patent.  Patented July 18, 1916.

Application filed September 15, 1914. Serial No. 861,858.

*To all whom it may concern:*

Be it known that I, EWING I. JEFFRIES, a citizen of the United States, residing at New Salem, in the county of Fayette and State of Pennsylvania, have invented new and useful Improvements in Steering-Gear Antirattlers, of which the following is a specification.

This invention relates to the steering gear of a motor car such as the present day automobile, the object of the invention being to provide a simple and effective device to compensate for wear between the steering arm of one of the knuckles and the yoke which connects the same to the shaft of the steering column, whereby all wear in the joint referred to is taken up as it occurs and the parts prevented from rattling.

With the above and other objects in view, the invention consists in the novel construction, combination and arrangement of parts, as herein described, illustrated and claimed.

In the accompanying drawings: Figure 1 is a plan view of the steering arm and yoke, showing the spring of this invention in its applied relation thereto. Fig. 2 is a side elevation of the same looking toward the extremities of the arms of the spring. Fig. 3 is a horizontal section through the joint and spring taken centrally of the latter. Fig. 4 is a detail perspective view of the spring detached.

Referring to the drawings 1 designates the steering arm or, as it is sometimes termed, the spindle arm which projects from and is secured to one of the steering knuckles of the steering gear of an automobile or similar vehicle, and 2 represents the yoke to which is attached the forward extremity of the operating rod or bar the rear end of which connects with the shaft in the steering column of the machine.

In carrying out the present invention I provide a spring designated generally at A, said spring embodying two coiled portions 3 which are wound in opposite directions, the inner extremities or terminals being extended in substantially parallel relation to each other and close together at the inner sides of the coils to form one of the spring arms 4, the extremities of the terminals forming said arm being bent substantially at right angles to the terminals and in the same direction or parallel relation so as to hook around one side of the yoke 2 in the manner clearly shown in the drawings.

In addition to the arm 4, the spring comprises another arm 5 which is formed by bending the central portion of the wire in which the spring is formed into U-shape and also deflecting or curving said arm to one side so as to partially embrace the sleeve or eye 6 at the extremity of the arm 1 and through which the connecting pivot pin or bolt 7 passes. It will be observed that the sleeve or eye 6 is centrally enlarged or formed with a central reinforcing ridge 8 and by reason of the U-shaped bend in the arm 5 of the spring, the latter maintains itself in a central position between the top and bottom branches 9 of the yoke 2. This prevents the spring from working in wearing contact with the branches of the yoke and also serves to sustain the sleeve or eye 6 centrally between the branches 9 when wear takes place between the top and bottom ends of the sleeve 6 and said branches of the yoke.

The sleeve or coupling end 6 has reversely tapered portions against which the side portions of the U-shaped spring arm bear and the device as a whole presses the sleeve 6 snugly against the pivot or bolt 7 at all times thereby compensating for wear between said elements and preventing rattling. The coils 3 occupy a position at one side of the yoke and do not interfere with the relative pivotal movement of the steering arm 1 and the yoke 2.

What I claim is:—

The combination with the steering arm and yoke of the steering gear of a motor vehicle, said arm having a coupling end formed with reversely tapered external faces, and the coupling end of the yoke being forked to straddle the coupling end of the arm, of a spring embodying reversely wound coils, an arm formed by the inner terminal portions of the coils extending in parallel and touching relation to each other and having their extremities bent in the same direction to engage the inside of the fork of the yoke, the outer terminals of the coils being bent to form a U-shaped arm which is curved and deflected laterally to partially embrace and center itself upon and relatively to the coupling end of the steering arm and brace said coupling end against the pivot which connects the yoke and arm.

In testimony whereof I, affix my signature in presence of two witnesses.

EWING I. JEFFRIES.

Witnesses:
S. O. McCORMICK,
ERNEST E. COFFMAN.